(12) United States Patent
Butzke

(10) Patent No.: US 11,207,937 B2
(45) Date of Patent: Dec. 28, 2021

(54) SUSPENSION SYSTEM FOR A VEHICLE

(71) Applicant: DRiV Automotive Inc., Lake Forest, IL (US)

(72) Inventor: Gary Butzke, Brighton, MI (US)

(73) Assignee: DRiV Automotive Inc., Lake Forest, IL (US)

( * ) Notice: Subject to any disclaimer, the term of this patent is extended or adjusted under 35 U.S.C. 154(b) by 124 days.

(21) Appl. No.: 16/689,477

(22) Filed: Nov. 20, 2019

(65) Prior Publication Data

US 2021/0146743 A1    May 20, 2021

(51) Int. Cl.
| | | |
|---|---|---|
| *B60G 17/04* | (2006.01) | |
| *B60G 17/056* | (2006.01) | |
| *B60G 17/044* | (2006.01) | |
| *B60G 9/02* | (2006.01) | |
| *B60G 21/06* | (2006.01) | |

(52) U.S. Cl.
CPC .......... *B60G 17/0416* (2013.01); *B60G 9/02* (2013.01); *B60G 17/044* (2013.01); *B60G 17/0565* (2013.01); *B60G 21/06* (2013.01); *B60G 2202/154* (2013.01); *B60G 2202/413* (2013.01)

(58) Field of Classification Search
CPC ...... B60K 7/0015; B60K 25/08; B60K 17/28; B60K 2025/106; B60K 25/10; B60G 13/14; B60G 2202/416
USPC .......................... 180/165, 53.6, 53.61, 53.62
See application file for complete search history.

(56) References Cited

U.S. PATENT DOCUMENTS

| | | | | |
|---|---|---|---|---|
| 2,293,105 A | * | 8/1942 | Charlesd ............ | B61D 27/0081 74/13 |
| 2,971,386 A | * | 2/1961 | Lippke .................. | B60K 25/08 74/55 |
| 3,008,728 A | * | 11/1961 | Fiala ..................... | B60G 21/06 280/104 |
| 3,236,323 A | * | 2/1966 | Austin .................. | B62D 61/02 180/209 |
| 3,306,599 A | * | 2/1967 | Allinquant ............ | B60G 15/12 267/64.16 |
| 3,921,746 A | * | 11/1975 | Lewus .................. | B60G 13/14 180/165 |
| 4,489,623 A | * | 12/1984 | Hakkenberg .......... | F16H 3/145 180/53.6 |
| 4,496,016 A | * | 1/1985 | Unsworth ............. | B60K 25/08 105/27 |
| 4,663,935 A | * | 5/1987 | Rohde ................... | B60C 5/004 417/233 |

(Continued)

FOREIGN PATENT DOCUMENTS

| | | |
|---|---|---|
| CN | 203979260 | 12/2014 |
| CN | 109606053 | 4/2019 |

(Continued)

*Primary Examiner* — James A English
(74) *Attorney, Agent, or Firm* — McGarry Bair PC

(57) ABSTRACT

A suspension system for a vehicle includes a knuckle defining a bore therethrough. The suspension system includes a wheel hub rotatably mounted on the knuckle. Further, the suspension system includes an axle at least partially received within the bore of the knuckle and operatively coupled to the wheel hub. The suspension system includes a pump driven by the axle and configured to generate pressurized fluid. The suspension system includes an actuator receiving pressurized fluid from the pump.

20 Claims, 4 Drawing Sheets

(56) References Cited

U.S. PATENT DOCUMENTS

| | | | | |
|---|---|---|---|---|
| 5,323,688 | A * | 6/1994 | Walker | B60K 6/12 |
| | | | | 91/491 |
| 5,472,062 | A * | 12/1995 | Nagai | B60G 3/00 |
| | | | | 180/252 |
| 5,941,334 | A | 8/1999 | Inagaki | |
| 6,809,426 | B2 * | 10/2004 | Naar | F03G 7/08 |
| | | | | 290/1 R |
| 9,030,033 | B2 * | 5/2015 | Yoo | F03G 7/08 |
| | | | | 290/1 C |
| 9,533,541 | B2 | 1/2017 | Kim | |
| 9,579,967 | B2 * | 2/2017 | Resch | B60B 27/0015 |
| 9,590,473 | B2 * | 3/2017 | Liao | H02K 7/003 |
| 10,279,641 | B2 * | 5/2019 | Anderson | B60G 17/08 |
| 10,532,646 | B2 * | 1/2020 | Shapiro | B60B 7/20 |
| 2005/0145423 | A1 * | 7/2005 | Hoyle | B60K 25/08 |
| | | | | 180/53.8 |
| 2007/0089924 | A1 * | 4/2007 | de la Torre | B60K 25/10 |
| | | | | 180/305 |
| 2008/0173483 | A1 * | 7/2008 | Phelps | B60K 25/08 |
| | | | | 180/53.4 |
| 2010/0219681 | A1 * | 9/2010 | Rini | B60K 6/485 |
| | | | | 303/152 |
| 2013/0104534 | A1 * | 5/2013 | Six | F15B 1/021 |
| | | | | 60/413 |
| 2015/0321532 | A1 * | 11/2015 | Reybrouck | B60G 15/063 |
| | | | | 280/5.514 |
| 2016/0047397 | A1 * | 2/2016 | Sikorski | B60K 6/12 |
| | | | | 60/416 |
| 2018/0154723 | A1 | 6/2018 | Anderson et al. | |
| 2018/0297432 | A1 | 10/2018 | Giovanardi et al. | |
| 2020/0290419 | A1 * | 9/2020 | Backes | B60K 17/358 |

FOREIGN PATENT DOCUMENTS

| | | | |
|---|---|---|---|
| EP | 1902874 | 3/2008 | |
| FR | 2405833 A1 * | 5/1979 | B60K 25/08 |
| GB | 849342 A | 9/1960 | |
| GB | 2082529 A * | 3/1982 | B60K 25/08 |

* cited by examiner

SUSPENSION SYSTEM FOR A VEHICLE

TECHNICAL FIELD

The present disclosure generally relates to suspension systems. More particularly, the present disclosure relates to an active suspension system for a vehicle.

BACKGROUND

Suspension systems include active and passive suspension systems. An active suspension system in a vehicle detects various inputs from a road surface through sensors, and controls various dynamic parameters of the vehicle through an electric control unit (ECU) based on the detected inputs. The active suspension system typically includes actuators which are used to control the dynamic parameters.

Typically, an active suspension system makes use of a pump to actively control the actuators. The pump is generally driven by a separate power source, such as an electric motor, thereby lowering efficiency. Further, separate power sources can increase noise and vibration produced by the suspension system. It can also be challenging to provide requisite power to the pump based on suspension requirements.

SUMMARY

In an aspect of the present disclosure, a suspension system for a vehicle is provided. The suspension system includes a knuckle defining a bore therethrough. The suspension system includes a wheel hub rotatably mounted on the knuckle. Further, the suspension system includes an axle at least partially received within the bore of the knuckle and operatively coupled to the wheel hub. The suspension system includes a pump driven by the axle and configured to generate pressurized fluid. The suspension system includes an actuator which receives pressurized fluid from the pump.

In another aspect of the present disclosure, a method of controlling suspension of a vehicle is provided. The method includes operatively engaging a wheel hub with an axle. The wheel hub is rotatably mounted on a knuckle. The method further includes driving a pump by the axle to generate pressurized fluid. The method further includes supplying an actuator with pressurized fluid from the pump. The method also includes controlling at least one dynamic parameter of the vehicle by the actuator.

In yet another aspect of the present disclosure, a suspension system for a vehicle is provided. The suspension system includes a knuckle defining a bore therethrough. The suspension system includes a wheel hub rotatably mounted on the knuckle. Further, the suspension system includes an axle at least partially received within the bore of the knuckle and operatively coupled to the wheel hub. The suspension system includes a pump driven by the axle and configured to generate pressurized fluid. The suspension system includes at least one hydraulic control valve disposed in fluid communication with the pump. Furthermore, the suspension system includes an actuator disposed in fluid communication with the at least one hydraulic control valve. The at least one hydraulic control valve is adapted to control flow of pressurized fluid from the pump to the actuator.

Other features and aspects of this disclosure will be apparent from the following description and the accompanying drawings.

DETAILED DESCRIPTION

Wherever possible, the same reference numbers will be used throughout the drawings to refer to same or like parts.

Aspects of the disclosure generally relate to a suspension system for a vehicle. The suspension system includes a knuckle and a wheel hub rotatably mounted on the knuckle. Further, the suspension system includes an axle operatively coupled to the wheel hub. The suspension system includes a pump driven by the axle and configured to generate pressurized fluid. The axle-driven pump of the present disclosure does not require a separate source of power (e.g., an electric motor) to run the pump, leading to improved efficiency. Since the suspension system of the present disclosure does not include any electric motor, the suspension system is less susceptible to noise and vibration issues generally associated with electric motor driven pumps. Further, the suspension system includes an actuator to receive pressurized fluid from the pump. This allows active control of different dynamic parameters of the vehicle by the suspension system of the present disclosure.

Figure 1:
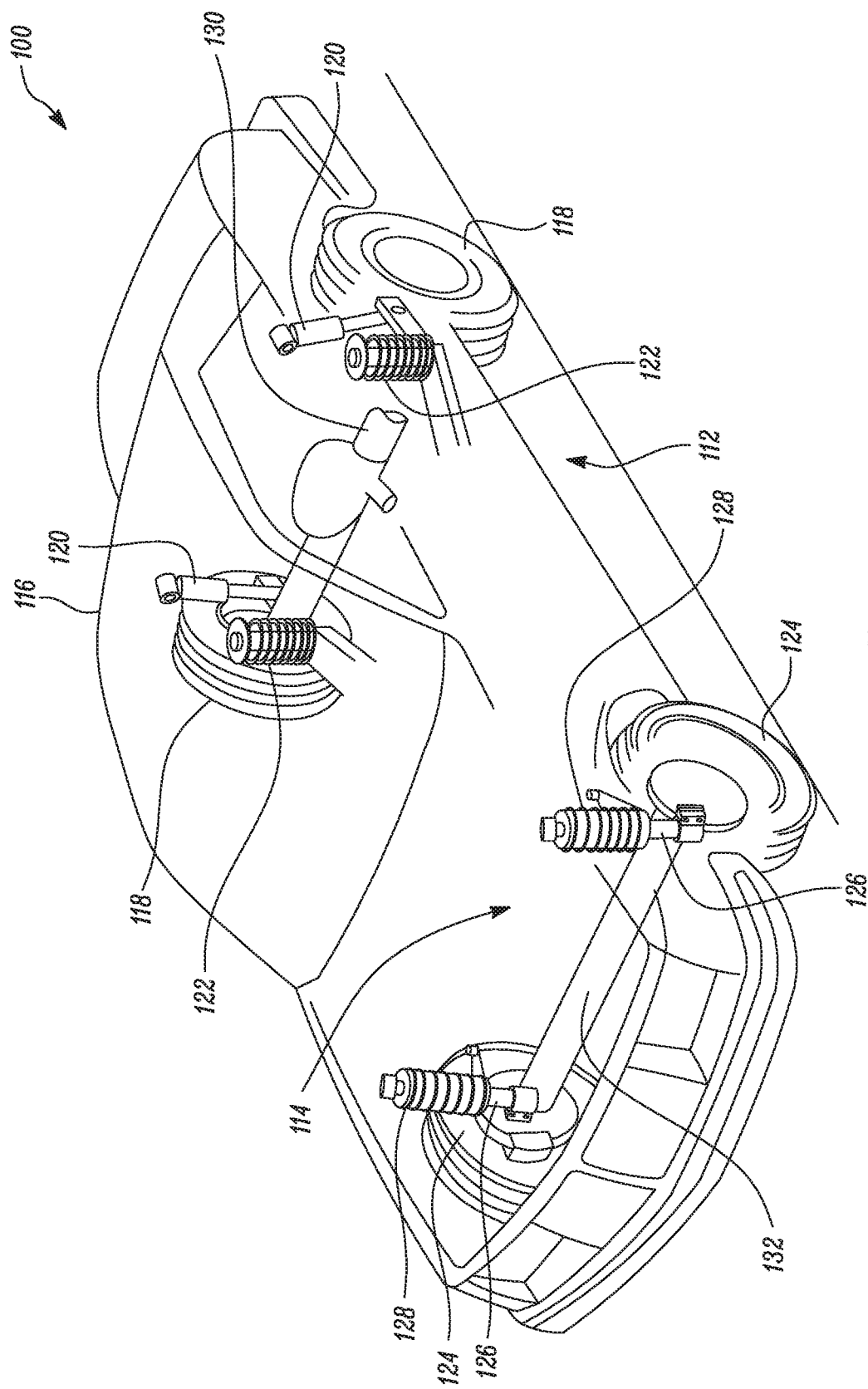
FIG. 1 is an illustration of a vehicle incorporating a suspension system, according to an aspect of the present disclosure.

FIG. 1 illustrates an exemplary vehicle 100 in accordance with the present disclosure. The vehicle 100 can include a vehicle driven by an internal combustion engine, an electric vehicle, or a hybrid vehicle. The vehicle 100 includes a rear suspension 112, a front suspension 114 and a body 116. The rear suspension 112 has a transversely extending rear axle assembly 130 (or simply, rear axle 130) adapted to operatively support a pair of rear wheels 118. The rear axle 130 is schematically shown in FIG. 1. The rear axle 130 is attached to the body 116 by a pair of actuators 120 and a pair of springs 122. The rear axle 130 can include two stub axles receiving power from an engine via a transmission. The transmission can include a differential. Similarly, the front suspension 114 includes a transversely extending front axle assembly 132 (or simply, front axle 132) to operatively support a pair of front wheels 124. The axle 132 is schematically shown in FIG. 1. The axle 132 is attached to the body 116 by a pair of actuators 126 and a pair of springs 128. The actuators 120 and 126 serve to dampen the relative motion of the unsprung portion (i.e., the front and rear suspensions 114, 112) with respect to the sprung portion (i.e., the body 116) of the vehicle 100. While the vehicle 100 has been depicted as a passenger car having front and rear axle assemblies, the actuators 120 and 126 can be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term actuator as used herein is meant to refer to actuators in general and thus will include McPherson struts and other actuator designs known in the art.

Figure 2:
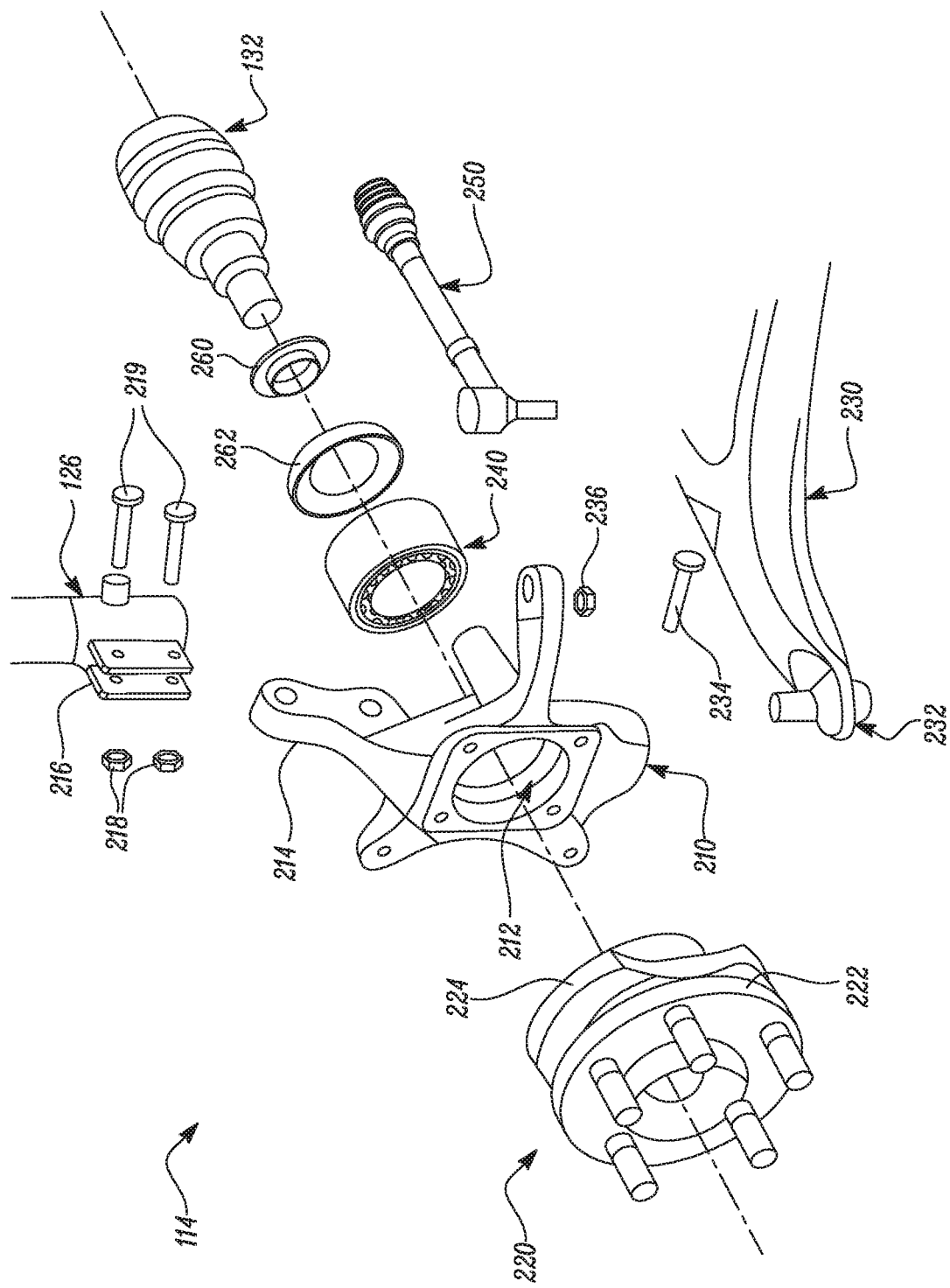
FIG. 2 is an exploded view around an end of an axle of the suspension system, according to an aspect of the present disclosure.

FIG. 2 is an exploded view around an end of the axle 132 of the suspension system 114, according to an aspect of the present disclosure. The present disclosure refers to the front suspension 114 as the "suspension system 114", however actual implementation of the present disclosure can have the suspension system 114 covering and working for the whole unsprung portion (i.e., the front and rear suspensions 114, 112). This will ensure desired damping characteristic of the vehicle 100 in accordance with requirements of an active suspension system, as will be evident to a person having ordinary knowledge in the art. For clarity and explanation considerations, the present disclosure illustrates various embodiments of the suspension system 114 which includes the front axle 132, however the suspension system 112 which includes the rear axle 130 can be readily implemented with the present disclosure. As illustrated, the suspension system 114 includes a knuckle 210 defining a bore 212 therethrough. The suspension system 114 includes a wheel hub 220 rotatably mounted on the knuckle 210. Further, the suspension system 114 includes the front axle 132 at least partially received within the bore 212 of the knuckle 210 and operatively coupled to the wheel hub 220. The wheel hub 220, in turn, receives the respective front wheel 124 (not shown in FIG. 2 for clarity) of the vehicle 100 as can be appreciated with reference to FIG. 1.

The suspension system 114 includes a pump 240 driven by the front axle 132 and configured to generate pressurized fluid. The suspension system 114 includes the actuator 126 which receives pressurized fluid from the pump 240. The actuator 126 can be any suspension damping and/or chassis lifting device, such as a damper. The actuator 126 can be a hydraulic actuator having a piston reciprocating inside a cylinder filled with a pressurized fluid. The knuckle 210 includes an arm 214 coupled to the actuator 126. More particularly, the arm 214 of the knuckle 210 engages with a bracket 216 of the actuator 126, such as by means of bolts 219 and nuts 218, or any other means as used or known in the art.

In an example, the suspension system 114 can control the actuator 126 based on inputs from a driver related to a desired ride characteristic (e.g. comfort, sport etc.) of the vehicle 100. The suspension system 114 can also control the actuator 126 to reduce air resistance by changing the height of the vehicle 100 at a high speed, and thus can enhance driving safety and fuel efficiency.

The wheel hub 220, the knuckle 210, the pump 240 and the rear axle 130 can be generally positioned in-line as illustrated in FIG. 2. Further, the knuckle 210 can be supported by different parts of the suspension system 114. As illustrated, the pump 240 can be positioned such that the pump 240 engages with the bore 212 of the knuckle 210 after assembly. As will be evident to a person having ordinary knowledge in the art, the knuckle 210, the pump 240 and the rear axle 130 can be assembled with a seal 262 and a wear sleeve 260 therebetween so as to ensure desired engagement of the knuckle 210 and the rear axle 130 and avoid any inadvertent wear during working. Further, a lower control arm 230 can engage with the knuckle 210 around a ball joint 232. An outer tie rod 250 can be connected to the knuckle 210 by means of nuts 236. The tie rod 250 can be a slender structural unit capable of carrying tensile loads. There are fastening means such as nuts 236 and bolts 234 which are used for assembly of the knuckle 210 with the lower control arm 230, the tie rod 250, and other components of the suspension system 114. The suspension system 114 of the present disclosure can have other components (say brake calipers) and accessories which are not shown in FIG. 2 for the purposes of clarity.

In some embodiments, the pump 240 can be disposed within the bore 212 of the knuckle 210. However, actual implementation of the present disclosure can include the pump 240 in any other position or arrangement with respect to the knuckle 210. Alternatively, the pump 240 can be disposed within the wheel hub 220. In some applications, the pump 240 can be co-axially mounted on the front axle 132. In some other embodiments, the pump 240 can be associated with a clutch (not shown) in order to disengage the pump 240 from the front axle 132 to avoid parasitic losses. The suspension system 114 can also include a pressure relief or a flow bypass or a displacement control mechanism to minimize parasitic losses or check flow when flow from the pump 240 is not desired. Moreover, there can be a provision of a powertrain/drivetrain torque management which can offset pump torque to negate any potential loss of driving torque transmitted to the wheels 124 by the front axle 132. This can also avoid any negative feedback to a driver. Though in the illustrated embodiment, the pump 240 is driven by the front axle 132, the pump 240 may alternatively be driven by the rear axle 130. In some cases, there can be multiple pumps 240 driven by the respective front axle 132 and the rear axle 130.

In some embodiments, the pump 240 of the present disclosure can be structurally integrated with the wheel hub 220. More particularly, a hub of the pump 240 can be integrated between an inner race 224 and an outer race 222 of the wheel hub 220. Moreover, the pump 240 of the present disclosure can be integrated with any component such as the front axle 132 or the knuckle 210 of the suspension system 114. Further, the pump 240 can be at least one of a gerotor pump or a vane type pump or any other type of pump as used or known in the art. More particularly, a variable displacement vane type pump can maximize displacement and flow at low-speeds, while at high-speeds minimize the displacement and flow of the pump 240. As will be evident to a person having ordinary knowledge in the art, choice of the pump 240 can depend upon multiple factors such as role and placement in the suspension system 114, displacement, flow requirements, type of the actuator 126 etc.

Figure 3:
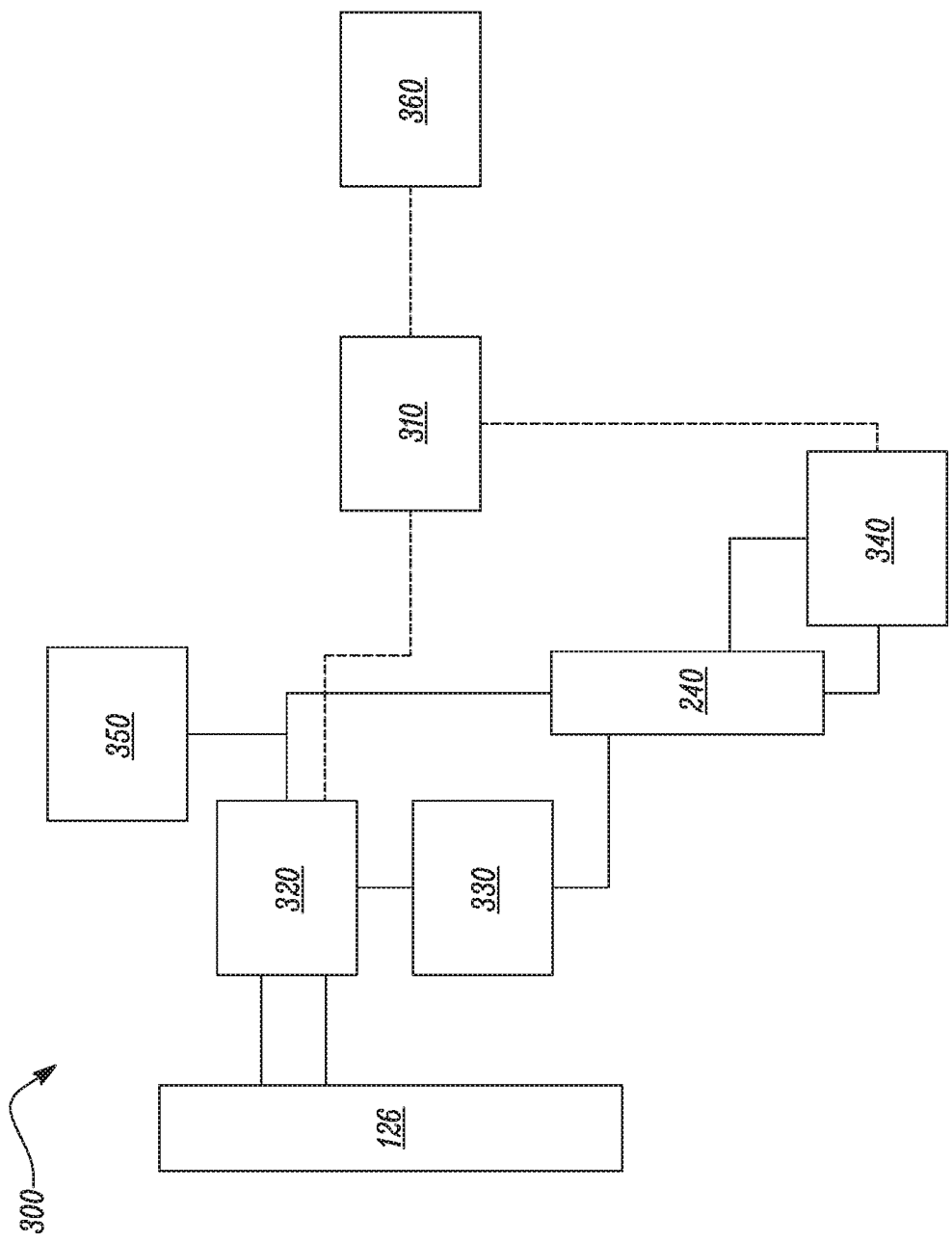
FIG. 3 is a schematic diagram of a hydraulic circuit for the suspension system, according to an aspect of the present disclosure.

FIG. 3 illustrates a schematic representation of a hydraulic circuit 300 for the suspension system 114. As illustrated, the suspension system 114 includes a fluid reservoir 330 disposed in fluid communication with the pump 240. Further, the suspension system 114 includes at least one hydraulic control valve 320 adapted to control flow of fluid between the pump 240 and the actuator 126. The at least one hydraulic control valve 320 is further adapted to control flow of fluid between the actuator 126 and the fluid reservoir 330. The hydraulic control valve 320 can be an electronically controlled valve, such as a solenoid valve. The hydraulic circuit 300 illustrates two set of connections, solid lines, such as between the actuator 126, the hydraulic control valve 320, the pump 240, the fluid reservoir 330 among others, which represent hydraulic connections between the components, while phantom or dashed lines, such as emanating from a control system 310 and other vehicle control systems, generally represent electrical connections, wireless connections or any other relevant connection technology as used or known in the art.

The suspension system 114 further includes an accumulator 350 disposed in fluid communication with the pump 240 and the hydraulic control valve 320. The accumulator 350 can be utilized to store any excess flow of the pump 240 at high-speeds and later utilize that flow during low-speed scenarios. The pump 240 is disposed in fluid communication with a pump control 340 to control pump displacement, pressure or flow. The pump control 340 can work mechanically, hydraulically and/or electronically. Further, the control system 310 (say an Electronic Control Unit (ECU)) can be operatively coupled to the pump control 340 and the hydraulic control valve 320. The pump control 340 can control various parameters of the pump 240, such as pump displacement, pressure and/or flow. The control system 310 can be operatively coupled to any other vehicle control system 360, such as a power controller. In some embodiments, the control system 310 can be used to control the control valve 320, and in turn, the suspension system 114 to obtain a desired suspension setting of the suspension system 114. The suspension setting can be any known setting or mode such as sports mode, comfort mode which will configure the actuator 126 as per the selected suspension setting which can be controlled by the control system 310. In some embodiments, the control system 310 controls at least one of a pressure, a flow and a displacement of the pump 240 based on a suspension requirement of the suspension system 114. Suspension requirement can include a damping requirement, height adjustment requirement, or any other requirements of the suspension system 114.

Figure 4:
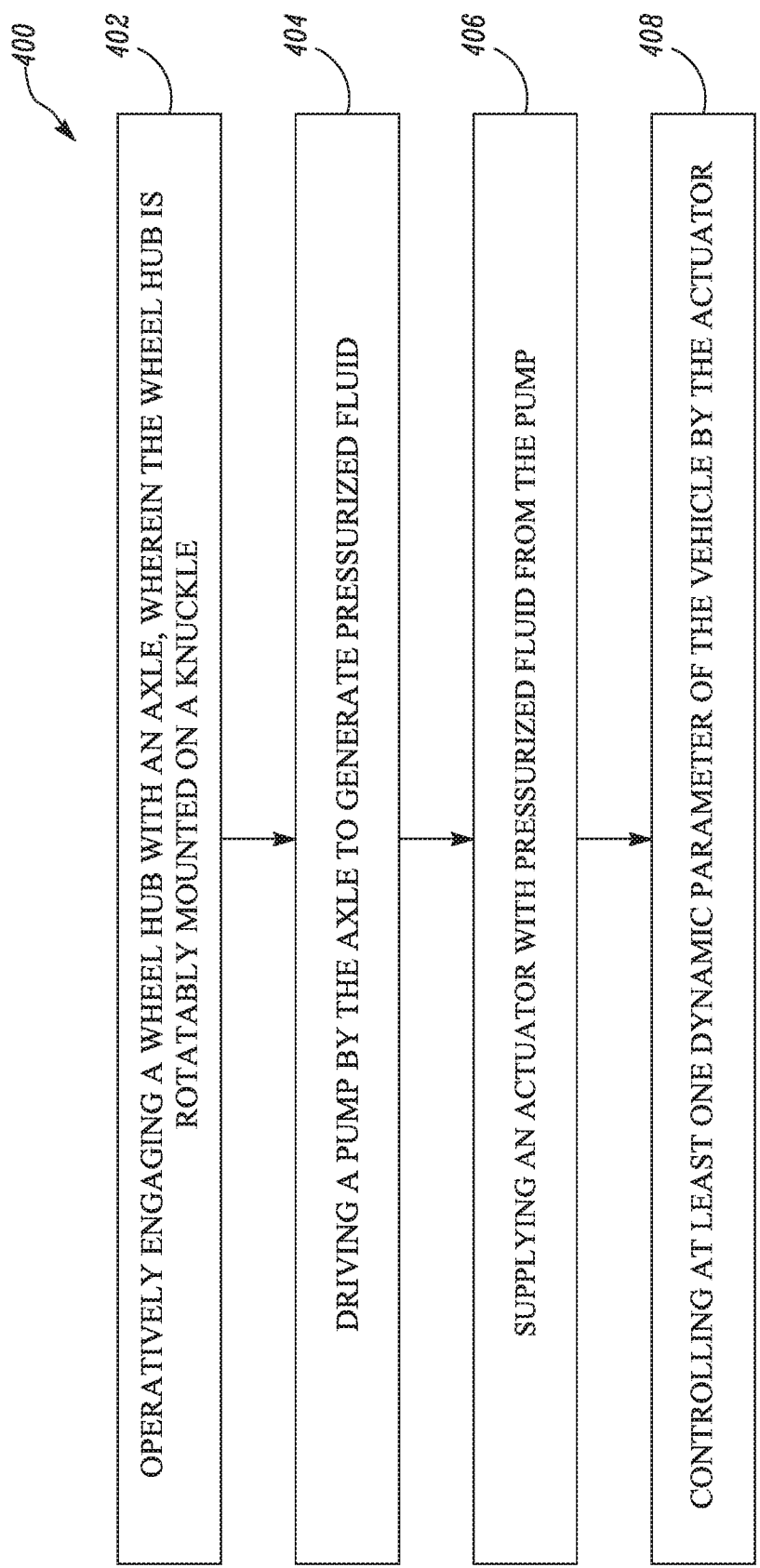
FIG. 4 is a flowchart for working of the suspension system, according to an aspect of the present disclosure.

FIG. 4 is a flowchart of a method 400 of controlling suspension of a vehicle. The method 400 will be described with reference to the suspension system 114 of the vehicle 100 described above with reference to FIGS. 1 to 3. At step 402, the method 400 includes operatively engaging the wheel hub 220 with the axle 132, where the wheel hub 220 is rotatably mounted on the knuckle 210. At step 404, the method 400 further includes driving the pump 240 by the axle 132 to generate pressurized fluid. At step 406, the method 400 further includes supplying the actuator 126 with the pressurized fluid from the pump 240. At step 408, the method 400 further includes controlling at least one dynamic parameter of the vehicle by the actuator 126. In some embodiments, the at least dynamic parameter is at least one of suspension damping, ride height adjustment, pitch, roll or any other parameter related to the suspension system 114.

Further, the method 400 allows setting of a default ride height of the vehicle 100 above a minimum threshold when the pump 240 is not driven or pressurized fluid is otherwise not available. The default ride height can be selected keeping in mind road conditions, speed-breaker dimensions, curb dimensions or any other factor related to the vehicle 100. The setting of the default ride height can be performed by any means known or used in the relevant art such as application of bias springs (not shown) which can keep the default ride height of the vehicle above the minimum threshold for conditions with almost zero hydraulic pressure (i.e., when the pump 240 is not driven). The method 400 further includes storing of pressurized fluid from the pump 240 in the accumulator 350. The accumulator 350 can be configured to store the pressurized fluid during intervals having excess supply. This will allow the accumulator 350 to supply desired amount of the stored pressurized fluid whenever needed by the suspension system 114 of the vehicle 100. Moreover, the method includes controlling flow of fluid between the pump 240 and the actuator 126. The method further provides the fluid reservoir 330 in fluid communication with the pump 240. In some embodiments, the method 400 further includes controlling at least one of a pressure, a flow and a displacement of the pump 240 based on a suspension requirement.

The present disclosure provides the axle-driven pump 240 for the suspension system 114 which does not require a separate source of power (e.g., an electric motor) to run the pump 240. Moreover, since the suspension system 114 does not include any electric motor, the suspension system 114 can be less susceptible to issues such as NVH (noise, vibration, harshness) which are generally associated with electric motor-powered pumps. Further, the pump 240 allows active control of different dynamic parameters (say ride height, suspension damping, pitch, and roll) of the vehicle 100 with decreased reliance on long hydraulic hoses associated with conventional suspensions with pumps powered by electric motors, unlike the suspension system 114 of the present disclosure.

While aspects of the present disclosure have been particularly shown and described with reference to the embodiments above, it will be understood by those skilled in the art that various additional embodiments can be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A suspension system for a vehicle, comprising:
a knuckle having an arm and defining a bore therethrough;
a wheel hub rotatably mounted on the knuckle;
an axle at least partially received within the bore of the knuckle and operatively coupled to the wheel hub;
a pump driven by the axle and configured to generate pressurized fluid; and
an actuator coupled to the arm and receiving pressurized fluid from the pump.

2. The suspension system of claim 1, wherein the pump is disposed within the bore of the knuckle.

3. The suspension system of claim 1, wherein the pump is disposed within the wheel hub.

4. The suspension system of claim 1, wherein the pump is co-axially mounted on the axle.

5. The suspension system of claim 1, further comprising a fluid reservoir disposed in fluid communication with the pump.

6. The suspension system of claim 5, further comprising at least one hydraulic control valve adapted to control flow of fluid between the pump and the actuator.

7. The suspension system of claim 6, wherein the at least one hydraulic control valve is further adapted to control flow of fluid between the actuator and the fluid reservoir.

8. The suspension system of claim 6, further comprising an accumulator disposed in fluid communication with the pump and the at least one hydraulic control valve.

9. The suspension system of claim 1, wherein the pump is at least one of a gerotor pump or a vane type pump.

10. A method of controlling suspension of a vehicle, comprising:
operatively engaging a wheel hub with an axle, wherein the wheel hub is rotatably mounted on a knuckle;
driving a pump by the axle to generate pressurized fluid;
supplying an actuator with pressurized fluid from the pump; and
controlling at least one dynamic parameter of the vehicle by the actuator.

11. The method of claim 10, wherein the at least dynamic parameter is at least one of suspension damping and ride height adjustment.

12. The method of claim 10, further setting a default ride height of the vehicle above a minimum threshold when the pump is not driven or pressurized fluid is not available.

13. The method of claim 10, further comprising storing pressurized fluid from the pump in an accumulator.

14. The method of claim 10, further comprising controlling flow of fluid between the pump and the actuator.

15. The method of claim 10, further comprising providing a fluid reservoir in fluid communication with the pump.

16. The method of claim 10, further comprising controlling at least one of a pressure, a flow and a displacement of the pump based on a suspension requirement.

17. A suspension system for a vehicle, comprising:
   a knuckle defining a bore therethrough;
   a wheel hub rotatably mounted on the knuckle; and
   an axle at least partially received within the bore of the knuckle and operatively coupled to the wheel hub;
   a pump driven by the axle and configured to generate pressurized fluid;
   at least one hydraulic control valve disposed in fluid communication with the pump; and
   an actuator disposed in fluid communication with the at least one hydraulic control valve;
   wherein the at least one hydraulic control valve is adapted to control flow of pressurized fluid from the pump to the actuator; and
   wherein at least one of a pressure, a flow and a displacement of the pump is controlled based on a suspension requirement of the suspension system.

18. The suspension system of claim 17, wherein the pump is disposed within the bore of the knuckle.

19. The suspension system of claim 17, wherein the pump is disposed within the wheel hub.

20. The suspension system of claim 17, further comprising a fluid reservoir disposed in fluid communication with the pump and the at least one hydraulic control valve, wherein the at least one hydraulic control valve is further adapted to control fluid flow between the actuator and the fluid reservoir.

* * * * *